United States Patent [19]

Lee

[11] Patent Number: 5,574,720
[45] Date of Patent: Nov. 12, 1996

[54] TRAFFIC OUTPUT SUPPRESSION APPARATUS AND METHOD FOR PREVENTING CONGESTION IN ASYNCHRONOUS TRANSFER MODE NETWORK

[75] Inventor: Soong H. Lee, Yuseong-ku, Rep. of Korea

[73] Assignee: Electronics and Telecommunications Research Institute, Daejeon, Rep. of Korea

[21] Appl. No.: 389,877

[22] Filed: Feb. 17, 1995

[30] Foreign Application Priority Data

Feb. 21, 1994 [KR] Rep. of Korea ..................... 1994-3064

[51] Int. Cl.⁶ .................................................. H04L 12/56
[52] U.S. Cl. ............................. 370/17; 370/60.1; 370/61; 370/94.2
[58] Field of Search ................................ 370/13, 16, 17, 370/58.1, 58.2, 58.3, 60, 60.1, 61, 85.6, 94.1, 94.2; 340/825.06, 825.5, 825.51; 371/5.1, 5.5

[56] References Cited

U.S. PATENT DOCUMENTS 5,042,029  8/1991  Hayakawa ................................. 370/60
5,090,011  2/1992  Fukata et al. ............................. 370/60

FOREIGN PATENT DOCUMENTS 466956  9/1991  European Pat. Off. .

OTHER PUBLICATIONS

Italian Pt Administration, Fondazione Ugo Bordoni, National Research Council, "Traffic Control for Best Effort Data Communications in ATM Networks: Simulation Comparison of Alternative Schemes, " G. Bagnoli et al.

IEEE, 1993, "Combined Reactive/Preventive Approach For Congestion Control in ATM Networks", Wassim Matragi, et al. pp. 1336–1342.

*Primary Examiner*—Alpus H. Hsu
*Attorney, Agent, or Firm*—Spencer & Frank

[57] ABSTRACT

A traffic output suppression apparatus and a method for preventing congestion in an asynchronous transfer mode network. The apparatus includes an input cell classification processor for detecting virtual connection identifiers and cell loss priority information from an input cell stream and classifying the input cell stream into real-time process type cells and process-after-standby type cells, a real-time process type cell processor for selectively discarding or passing the real-time process type cells from the input cell classification processor in response to the cell loss priority information from the input cell classification processor and external network node state information, a network node state processor for generating a storage command and an extraction command in response to the external network node state information, a process-after-standby type cell processor for processing the process-after-standby type cells from the input cell classification processor in response to the storage command and the extraction command from the network node state processor, and a cell output processor for transferring the output cells from the real-time process type cell processor or the output cells from the process-after-standby type cell processor in a first-in-first-out manner.

6 Claims, 4 Drawing Sheets

TRAFFIC OUTPUT SUPPRESSION APPARATUS AND METHOD FOR PREVENTING CONGESTION IN ASYNCHRONOUS TRANSFER MODE NETWORK

BACKGROUND OF THE INVENTION

1. Field of the Invention

The present invention relates to a traffic output suppression apparatus and a method for recognizing a state of an asynchronous transfer mode (referred to hereinafter as ATM) network node and preventing congestion due to a variation of the input traffic to the ATM network node in accordance with the recognized result, the traffic output suppression apparatus being disposed in a user-network interface unit connected to the ATM network node.

2. Description of the Prior Art

Conventional congestion control methods include a prevention control method such as a connection accept control (CAC) method or a user parameter control (UPC) method, and a reaction control method such as an explicit congestion notification (ECN) method. The prevention control method utilizes fixed traffic parameters which are previously adjusted for the observance of a traffic amount negotiated between an ATM network and the user. The reaction control method utilizes a congestion notification signal so that no further bad effect can be exerted on adjacent ATM network nodes or terminals after congestion has occurred.

However, although the conventional prevention control method enables ATM virtual connections to observe the negotiated traffic amount, the congestion occurrence probability is still present under the control using the fixed traffic parameters, in the case where traffic after a statistical multiplexing operation is performed in a user-network interface means is directly transferred to the adjacent ATM network node- Namely, in this case, the control using the fixed traffic parameters cannot perfectly cope with a variation in the amount of traffic due to the setting and release of the ATM virtual connections and an unpredictable variation of the traffic stream due to a statistical characteristic. On the other hand, the conventional reaction control method has nothing but signifying emergency means after the congestion occurs in the ATM network node. Further, a longer delay time required in the transfer of the congestion notification signal makes the protection of user's important information more difficult.

SUMMARY OF THE INVENTION

Therefore, the present invention has been made in view of the above problems, and it is an object of the present invention to provide a traffic output suppression apparatus and method in which a network state recognition signal reception function is provided in a user-network interface unit connected to a node of an ATM network which can provide a variety of services, to recognize a state of the ATM network node. Cell temporary storage and discard functions are also provided in the user-network interface unit to suppress a cell stream to the ATM network node in accordance with the recognized result, so that congestion due to a variation of the input traffic to the ATM network node can be prevented beforehand.

In accordance with one aspect of the present invention, there is provided a traffic output suppression apparatus for preventing congestion in an asynchronous transfer mode network. The traffic output suppression apparatus comprises input cell classification processing means for detecting virtual connection identifiers and cell loss priority information from an input cell stream and for classifying the input cell stream into real-time process type cells and process-after-standby type cells according to service characteristics required by virtual connections corresponding to the input cell stream; real-time process type cell processing means for selectively discarding or passing the real-time process type cells from the input cell classification processing means in response to the cell loss priority information from the input cell classification processing means and external network node state information; network node state processing means for generating a storage command and an extraction command as control signals for the processing of the process-after-standby type cells from the input cell classification processing means in response to the external network node state information; process-after-standby type cell processing means for processing the process-after-standby type cells from the input cell classification processing means in response to the storage command and the extraction command from the network node state processing means, the process-after-standby type cell processing means outputting directly or storing the process-after-standby type cells from the input cell classification processing means if the network node state is a normal state, whereas storing the process-after-standby type cells from the input cell classification processing means without outputting them if the network node state is a quasi-congestion state or a congestion state; and cell output processing means for transferring the output cells from the real-time process type cell processing means or the output cells from the process-after-standby type cell processing means in a first-in-first-out manner.

In accordance with another aspect of the present invention, there is provided a traffic output suppression method for preventing congestion in an asynchronous transfer mode network. The traffic output suppression method comprises a first step of allowing input cell classification processing means to detect a virtual connection identifier from an input cell, analyze the type of the input cell according to the detected virtual connection identifier and determine the type of the input cell as a result of the analysis; a second step of allowing real-time process type cell processing means to pass directly or discard the input cell in response to external network node state information and cell loss priority information if it is determined at the first step that the input cell is of the real-time process type; and a third step of allowing process-after-standby type cell processing means to store temporarily or pass the input cell, or store the input cell and output a previously stored cell in response to control commands if it is determined at the first step that the input cell is of the process-after-standby type, the control commands being provided from network node state processing means based on the external network node state information.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figures 1A, 1B:
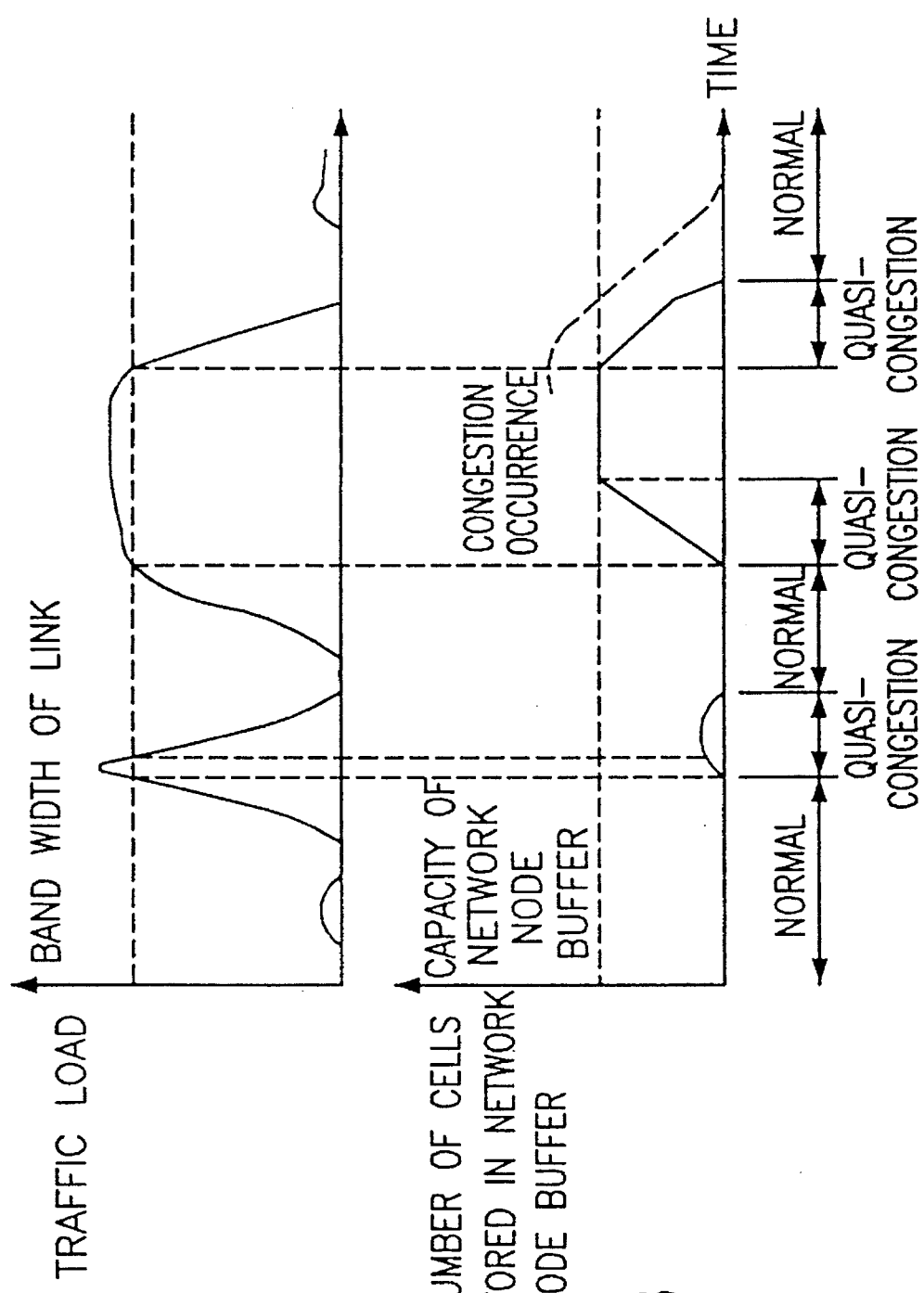
FIG. 1A and 1B are graphs illustrating a state of congestion in an ATM network node.

Referring to FIG. 1, there is shown a graph illustrating a state of congestion in an ATM network node, in which the number of cells being accumulated in a network node buffer exceeds the capacity of the network node buffer in response to an input traffic load to the ATM network node being beyond the band width of the link because of a variation thereof.

In the normal state, the traffic load is not beyond the band width of the link. In the congested state, an overflow of the network node buffer occurs. As will be seem from Fig. 1, a transition from the normal state to the congestion state passes necessarily through an intermediate or quasi-congestion state in which the cells are accumulated in the network node buffer because of the traffic load being beyond the band width of the link.

If the network node buffer has a sufficient capacity, enough time can be secured for transferring information regarding the occurrence of the quasi-congestion state to a user-network interface unit connected to the ATM network node. The congestion in the ATM network node can be prevented beforehand by suppressing the traffic output in all user-network interface means connected to the ATM network node at the quasi-congestion state.

Figure 2:
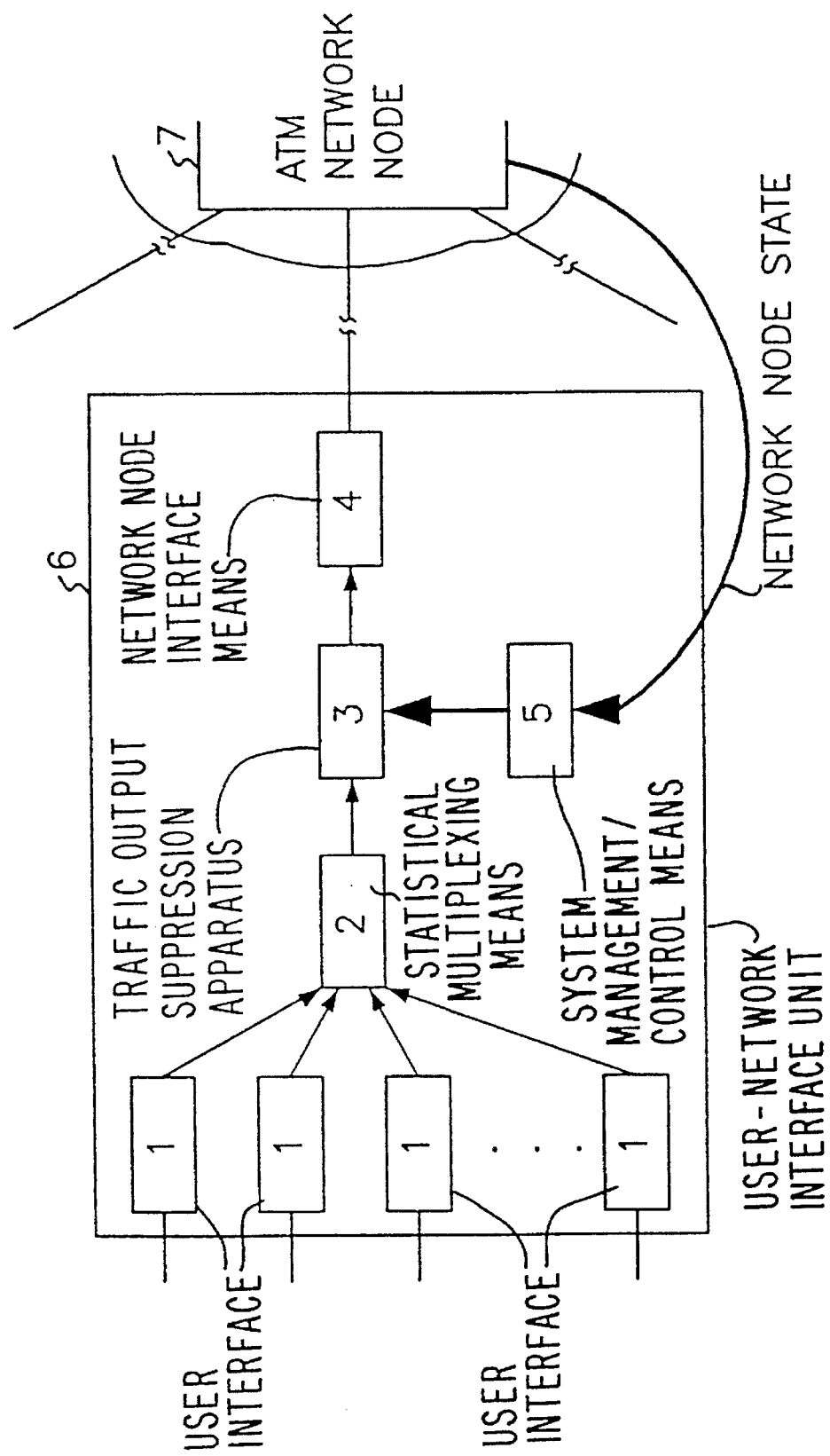
FIG. 2 is a block diagram of a user-network interface unit connected to the ATM network node.

Referring to FIG. 2, there is shown a block diagram of a user-network interface unit 6 connected to an ATM network node 7. As shown in this drawing, a traffic output suppression apparatus 3 of the present invention is provided in the user-network interface unit 6. The traffic output suppression apparatus 3 is adapted to receive a cell stream from a statistical multiplexing means 2 and control a cell stream to a network node interface means 4 in response to a control signal from a system management/control means 5. The statistical multiplexing means 2 multiplexes cells from user interface means 1 and outputs the resultant cell stream to the traffic output suppression apparatus 3. The system management/control means 5 generates the control signal in response to network node state information from the ATM network node and outputs the generated control signal to the traffic output suppression apparatus 3, thereby causing the traffic output suppression. apparatus 3 to suppress selectively the cell stream to the network node interface means 4.

Figure 3:
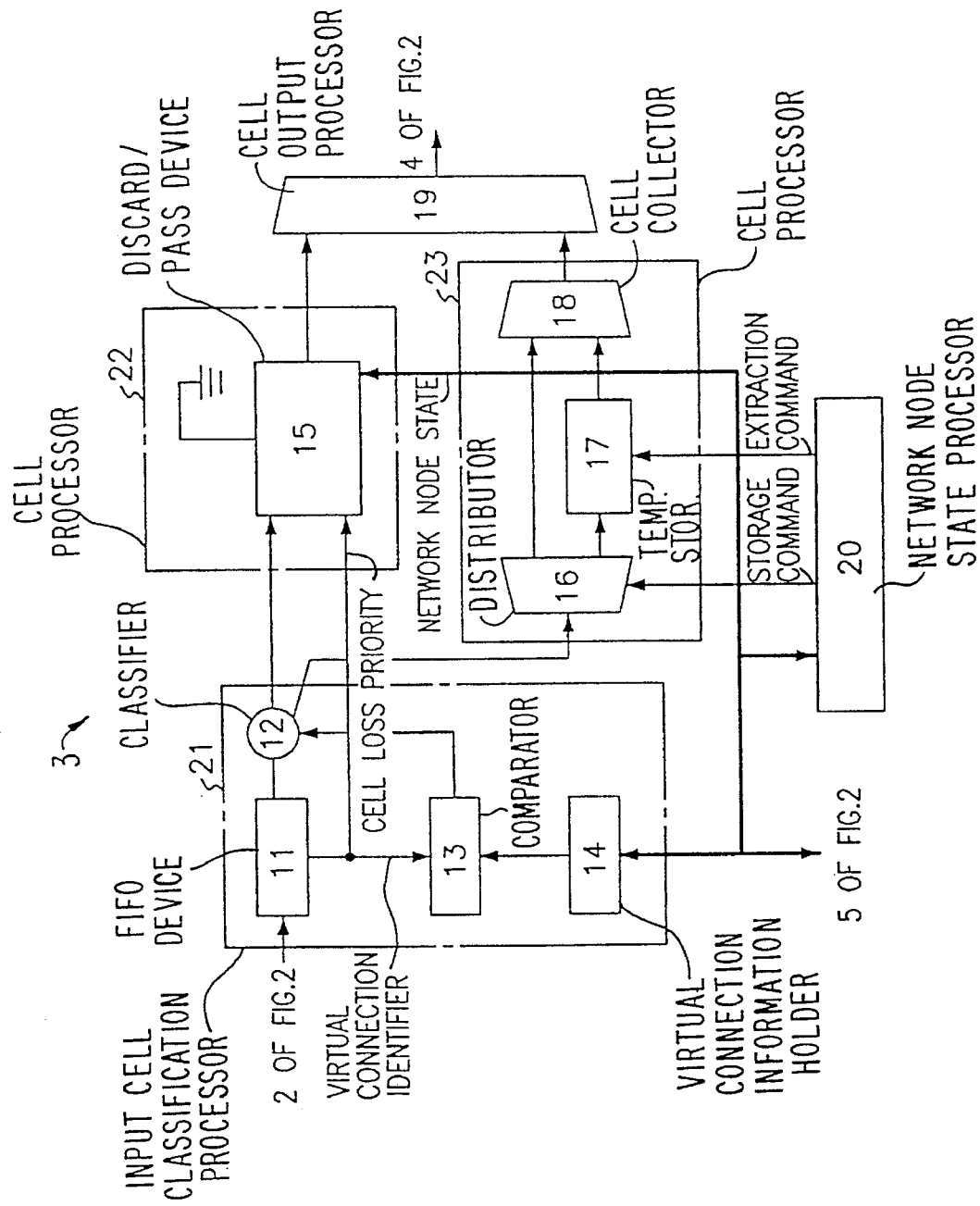
FIG. 3 is a block diagram of a traffic output suppression apparatus in accordance with the present invention.

Referring to FIG. 3, there is shown a block diagram of the traffic output suppression apparatus in accordance with the present invention. As shown in this drawing, the traffic output suppression apparatus comprises an input cell classification processor 21 for receiving the cell stream from the statistical multiplexing means 2 in FIG. 2 and processing the inputted cell stream, a real-time process type cell processor 22 for processing real-time process type cells from the input cell classification processor 21, a process-after-standby type cell processor 23 for processing process-after- standby type cells from the input cell classification processor 21, a network node state processor 20 for generating control signals for the processing of the process-after-standby type cells from the input cell classification processor 21 in response to the network node state information from the system management/control means 5 in FIG. 2 and outputting the generated control signals to the process-after-standby type cell processor 23, and a cell output processor 19 for transferring output cells from the real-time process type cell processor 22 or output cells from the Process-after-Standby type cell processor 23 to the network node interface means 4 in FIG. 2, The input cell classification processor 21 includes a first-in-first-out (referred to hereinafter as FIFO) device 11 for receiving and outputting cells of the cell stream from the statistical multiplexing means 2 in FIG. 2.

The FIFO device 11 detects virtual connection identifiers and cell loss priority information from the inputted cell stream. The cell loss priority information from the FIFO device 11 is transferred to the real-time process type cell processor 22.

The input cell classification processor 21 further includes a comparator 13 for comparing the virtual connection identifiers from the FIFO device 11 with virtual connection information, and a classifier 12 for classifying the cell stream from the FIFO device 11 into the real-time process type cells and the process-after-standby type cells in accordance with the compared result from the comparator 13. The classifier 12 outputs the classified real-time process type and process-after-standby type cells to the real-time process type cell processor 22 and the process-after-standby type cell processor 23, respectively. Here, the real-time process type cells may include audio and motion video information and the process-after-standby type cells may include computer data.

Further, the input cell classification processor 21 includes a virtual connection information holder 14 for inputting the virtual connection information from the system management/control means 5 in FIG. 2 and Outputting the inputted virtual connection information to the comparator 13.

The real-time process type cell processor 22 includes a cell discard/pass device 15 for selectively discarding or passing the real-time process type cells from the classifier 12 in the input cell classification processor 21 in response to the cell loss priority information from the FIFO device 11 in the input cell classification processor 21 and the network node state information from the system management/control means 5 in FIG. 2. The passed cells from the cell discard/pass device 15 are transferred to the cell output processor 19.

The network node state processor 20 is adapted to generate a storage command and an extraction command as the control signals for the processing of the process-after-standby type cells from the input cell classification processor 21 in response to the network node state information from the system management/control means 5 in FIG. 2, and to output the generated storage and extraction commands to the process-after-standby type cell processor 23.

The process-after-standby type cell processor 23 includes a distributor 16 for passing the process-after-standby type cells from the classifier 12 in the input cell classification processor 21 or outputting them for storage in response to the storage command from the network node state processor 20, a cell temporary storage device 17 for storing the output cells from the distributor 16 in the input order and outputting the stored cells in response to the extraction command from the network node state processor 20, and a cell collector 18 for collecting the passed cells from the distributor 16 or the output cells from the cell temporary storage device 17 and outputting the collected cells to the cell output processor 19.

The cell output processor 19 is adapted to transfer the 10 output cells from the cell discard/pass device 15 in the real-time process type cell processor 22 or the output cells from the cell collector 18 in the process-after-standby type cell processor 23 to the network node interface means 4 in FIG. 2 in a first-in-first-out manner.

Figure 4:
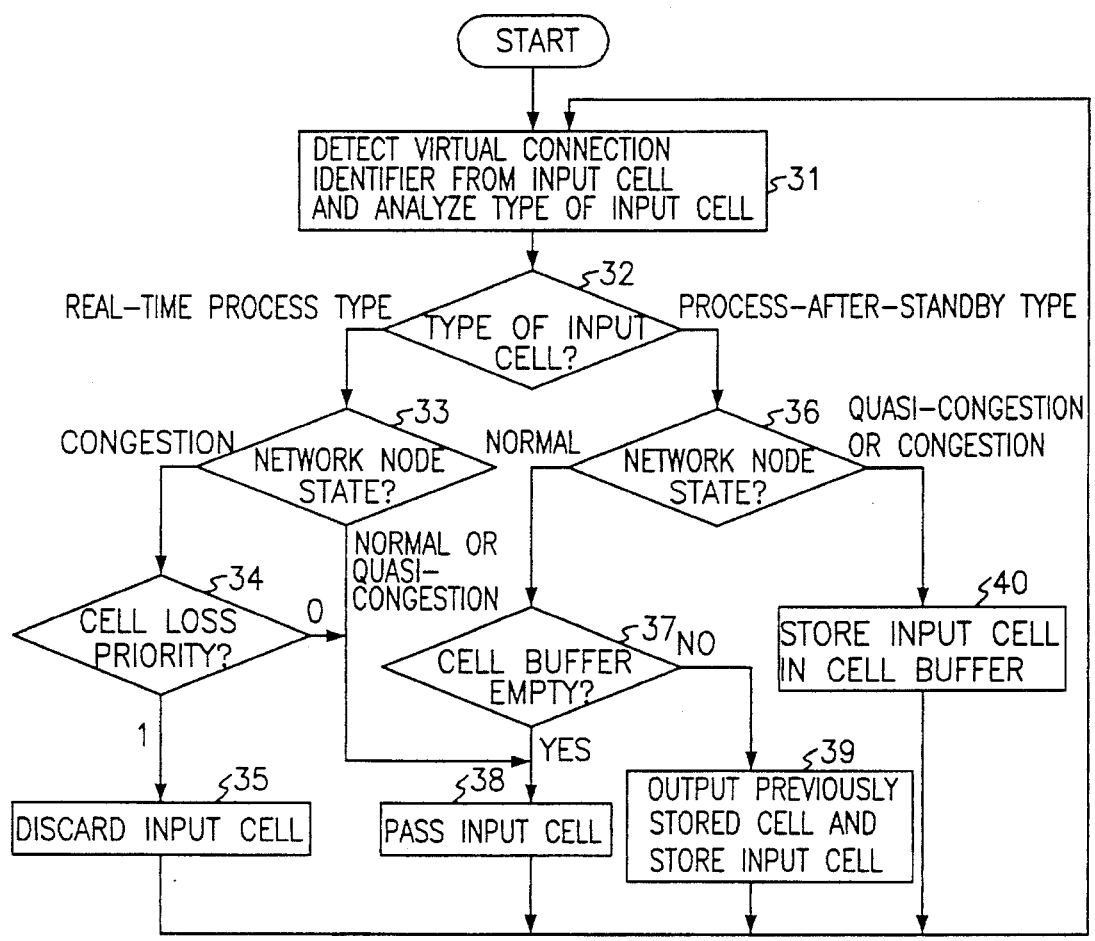
FIG. 4 is a flowchart illustrating a traffic output suppression method in accordance with the present invention.

Referring to FIG. 4, there is shown a flowchart illustrating a traffic output suppression method which is performed by the traffic output suppression apparatus in FIG. 3 in accordance with the present invention. First, the input cell classification processor 21 in FIG. 3 detects a virtual connection identifier from an input cell and analyzes the type of the input cell according to the detected virtual connection identifier at the step 31. As a result of analysis at step 31, the input cell classification processor 21 determines the type of the input cell at step 32. If it is determined at step 32 that the input cell is of the real-time process type, the input cell classification processor 21 transfers the input cell to the real-time process type cell processor 22 in FIG. 3. The real-time process type cell processor 22 checks the network node state information from the system management/control means 5 in FIG. 2 at step 33. If it is determined at step 33 that the network node state is the normal state or the quasi-congestion state, the real-time process type cell processor 22 passes the input cell directly at step 38. Then, the operation returns to the initial step 31. On the contrary, if it is determined at step 33 that the network node state is the congestion state, the real-time process type cell processor 22 checks the cell loss priority of the input cell at the step 34. If it is determined at step 34 that the cell loss priority of the input cell is low, the real-time process type cell processor 22 discards the input cell at the step 35. On the contrary, if it is determined at step 34 that the cell loss priority of the input cell is high, the real-time process type cell processor 22 passes the input cell directly at the step 38. Then, the operation returns to the initial step 31.

On the other hand, in the case where it is determined at step 32 that the input cell is of the process-after-standby type, the input cell classification processor 21 in FIG. 3 transfers the input cell to the process-after-standby type cell processor 23 in FIG. 3. The process-after-standby type cell processor 23 checks the network node state information from the system management/control means 5 in FIG. 2 at step 36. If it is determined at step 36 that the network node state is the normal state, the process-after-standby type cell processor 23 checks at the step 37 whether a cell buffer of the cell temporary storage device 17 thereof is in an empty state. If it is determined at step 37 that the cell buffer is in the empty state, the process-after-standby type cell processor 23 passes the input cell at step 38. Then, the operation returns to the initial step 31. On the contrary, if it is determined at step 37 that the cell buffer is not in the empty state, the process-after-standby type cell processor 23 outputs a cell previously stored in the cell buffer and stores the input cell in the cell buffer at step 39. Then, the operation returns to the initial step 31. By the way, in the case where it is determined at step 36 that the network node state is the quasi-congestion state or the congestion state, the process-after-standby type cell processor 23 Stores the input cell in the cell buffer of the cell temporary storage device 17 at step 40. Then, the operation returns to the initial step 31.

As will be apparent from the above description, the present invention has the following effects.

First, a network State recognition signal reception function is provided to recognize the node state of the ATM network which can provide a variety of services. The input cells are classified according to service characteristics. The classified cells are controlled by the cell temporary storage and discard functions based on the recognized result. Therefore, the cell stream to the ATM network node is selectively suppressed so that congestion due to the variation of the input traffic to the ATM network node can be prevented beforehand, resulting in all resources of the ATM network being protected.

Second, the traffic output suppression apparatus of the present invention can be applied to a broad-terminal adapter (B-TA) and a broad-network terminal (B-NT) in an ATM access network or an output stage of the ATM network node to perform the congestion prevention function to manage and protect the resources of the ATM network in an ATM cell process for the fundamental implementation of a broad-integrated services digital network (B-ISDN).

Third, although the transfer delay time caused in the conventional reaction control method is somewhat long, a sufficient buffer capacity in the ATM network node allows the traffic output to be suppressed in the user-network interface unit before congestion occurs in the ATM network node.

Fourth, the control using the network node state information can perfectly cope with the unpredictable network node state caused in the conventional prevention control method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claim is:

1. A traffic output suppression apparatus for preventing congestion in an asynchronous transfer mode network having a network node, comprising:

input cell classification processing means for detecting virtual connection identifiers and cell loss priority information from an input cell stream and classifying the input cell stream into real-time process type cells and process-after-standby type cells according to service characteristics required by virtual connections corresponding to the input cell stream;

real-time process type cell processing means for selectively discarding or passing the real-time process type cells from said input cell classification processing means in response to the cell loss priority information from said input cell classification processing means and network node state information received from the network node;

network node state processing means for generating a storage command and an extraction command as control signals for the processing of the process-after-standby type cells from said input cell classification processing means in response to the network node state information;

process-after-standby type cell processing means for processing the process-after-standby type cells from said input cell classification processing means in response to the storage command the extraction command from said network node state processing means, said process-after-standby type cell processing means outputting directly or storing the process-after-standby type cells from said input cell classification processing means if the network node state is a normal state, and storing the process-after-standby type cells from said input cell classification processing means without outputting them if the network node state is a quasi-congestion state or a congestion state; and cell output processing means for transferring the output cells from said real-time process type cell processing means or the output cells from said process-after-standby type cell processing means in a first-in-first-out manner.

2. A traffic output suppression apparatus for preventing congestion in an asynchronous transfer mode network, as set forth in claim 1, wherein said input cell classification processing means includes:

a first-in-first-out device for receiving and outputting the cells of the input cell stream, said first-in-first-out device detecting the virtual connection identifiers and the cell loss priority information from the input cell stream and outputting the detected cell loss priority information to said real-time process type cell processing means;

a comparator for comparing the virtual connection identifiers from said first-in-first-out device with virtual connection information;

a classifier for classifying the cell stream from said first-in-first-out device into the real-time process type cells and the process-after-standby type cells in accordance with the compared result from said comparator and outputting the classified real-time process type and process-after-standby type cells to said real-time process type cell processing means and said process-after-standby type cell processing means, respectively; and a virtual connection information holder for receiving the virtual connection information from the outside and outputting the inputted virtual connection information to said comparator.

3. A traffic output suppression apparatus for preventing congestion in an asynchronous transfer mode network, as set forth in claim 1, wherein said process-after-standby type cell processing means includes:

a distributor for passing the process-after-standby type cells from said input cell classification processing means or outputting them for storage in response to the storage command from said network node state processing means;

a cell temporary storage device for storing the output cells from said distributor in the input order and outputting the stored cells in response to the extraction command from said network node state processing means; and a cell collector for collecting the passed cells from said distributor or the output cells from said cell temporary storage device and outputting the collected cells to said cell output processing means.

4. A traffic output suppression method for preventing congestion in an asynchronous transfer mode network having a network node, comprising the steps of:

(a) allowing input cell classification processing means to detect a virtual connection identifier from an input cell and to classify the input cell as a real-time process type cell or a process-after-standby type cell according to the detected virtual connection identifier;

(b) allowing real-time process type cell processing means to pass directly or discard the input cell in response to network node state information received from the network node and cell loss priority information received from the input cell classification means if the input cell is classified as a real-time process type cell in step (a); and (c) allowing process-after-standby type cell processing means to store temporarily or pass the input cell, or store the input cell and output a previously stored cell in response to control commands if the input cell is classified as a process-after-standby type cell in step (a), the control commands being provided from network node state processing means based on the network node state information.

5. A traffic output suppression method for preventing congestion in an asynchronous transfer mode network, as set forth in claim 4, wherein said step (b) includes the steps of:

(b-1) allowing said real-time process type cell processing means to check the network node state if the input cell is classified as a real-time process type in step (a);

(b-2) allowing said real-time process type cell processing means to pass the input cell directly if it is determined at said step (b-1) that the network node state is a normal state or a quasi-congestion state; and (b-3) allowing said real-time process type cell processing means to check the cell loss priority of the input cell if it is determined at said step (b-1) that the network node state is a congestion state and then allowing said real-time process type cell processing means to discard the input cell if the cell loss priority of the input cell is low, and to pass the input cell directly if the cell loss priority of the input cell is high.

6. A traffic output suppression method for preventing congestion in an asynchronous transfer mode network, as set forth in claim 4, wherein said step (c) includes the steps of:

(c-1) allowing said process-after-standby type cell processing means to check the network node state if the input cell is classified as a process-after-standby type cell in step (a);

(c-2) allowing said process-after-standby type cell processing means to check whether a cell buffer thereof is in an empty state if it is determined at said step (c-1) that the network node state is a normal state and then allowing said process-after-standby type cell processing means to pass the input cell if said cell buffer is in the empty state, and to output a cell previously stored in said cell buffer and store the input cell in said cell buffer if said cell buffer is not in the empty state; and (c-3) allowing said process-after-standby type cell processing means to store the input cell in said cell buffer if it is determined at said step (c-1) that the network node state is a quasi-congestion state or a congestion state.

* * * * *